United States Patent
Yoshizaki et al.

[11] Patent Number: 5,966,931
[45] Date of Patent: Oct. 19, 1999

[54] POWER SUPPLY CONTROL SYSTEM FOR AN ELECTRICALLY HEATED CATALYTIC CONVERTER

[75] Inventors: Kouji Yoshizaki, Numazu; Kazuhiro Sakurai, Gotenba; Masahiko Hibino, Susono, all of Japan

[73] Assignee: Toyota Jidosha Kabushiki Kaisha, Aichi-Ken, Japan

[21] Appl. No.: 08/926,802

[22] Filed: Sep. 10, 1997

[30] Foreign Application Priority Data

Sep. 18, 1996 [JP] Japan .................................. 8-246187

[51] Int. Cl.$^6$ .......................................................... F01N 3/00
[52] U.S. Cl. .............................. 60/284; 60/300; 60/303; 60/286
[58] Field of Search .......................... 60/284, 300, 286, 60/276, 303

[56] References Cited

U.S. PATENT DOCUMENTS

| | | |
|---|---|---|
| 5,224,335 | 7/1993 | Yoshizaki . |
| 5,321,231 | 6/1994 | Schmalzriedt et al. ............... 219/497 |
| 5,390,493 | 2/1995 | Fujishita et al. ....................... 60/284 |
| 5,404,720 | 4/1995 | Laing . |
| 5,444,978 | 8/1995 | Yoshizaki et al. . |
| 5,512,789 | 4/1996 | Lyon . |
| 5,689,952 | 11/1997 | Kato et al. ............................. 60/277 |
| 5,806,307 | 9/1998 | Aoki et al. ............................. 60/277 |
| 5,848,530 | 12/1998 | Matsuoka et al. ..................... 60/277 |

FOREIGN PATENT DOCUMENTS

| | | |
|---|---|---|
| 2-46139 | 2/1990 | Japan . |
| 4-276111 | 10/1992 | Japan . |
| 4-279718 | 10/1992 | Japan . |
| 8-42339 | 2/1996 | Japan . |

OTHER PUBLICATIONS

SAE 941042, "Development of an Alternator-Powered Electrically-Heated Catalyst System", Paul M. Laing.
SAS 960342, "Study on Conformity Technology with ULEV Using EHC System", Yuichi Shimasaki, et al.
Copending U.S. Patent Application Serial No. 08/622,853, filed Jun. 12, 1996.

*Primary Examiner*—Edward K. Look
*Assistant Examiner*—Binh Tran
*Attorney, Agent, or Firm*—Kenyon & Kenyon

[57] ABSTRACT

In the power supply control system, an electrically heated catalytic converter (EHC) is connected to an alternator output terminal via a switch SW1, and a battery is connected to the alternator via a switch SW2 in parallel with the EHC. A control unit (ECU) for controlling the operation of the switches SW1 and SW2 is provided. When the engine has started, the ECU turns on the SW1 and turns off the SW2 to supply electric power to the EHC directly from the alternator. After the EHC is heated to the activating temperature and starts its catalytic action, the ECU turns on both the switches SW1 and SW2 to supply electric power to the EHC from the battery to maintain the temperature of the EHC. Since the electric power for raising the temperature of the EHC is supplied in the condition where the battery is disconnected from the alternator, the output voltage can be increased to a value higher than a normal output voltage for charging the battery. Therefore, a relatively large electric power can be supplied to the EHC without imposing an excessive load on the battery.

2 Claims, 9 Drawing Sheets

EXHAUST GAS

POWER SUPPLY CONTROL SYSTEM FOR AN ELECTRICALLY HEATED CATALYTIC CONVERTER

BACKGROUND OF THE INVENTION

1. Field of the Invention

The present invention relates to a power supply control system for an electrically heated catalytic converter which controls an electric supply to an electrically heated catalytic converter.

2. Description of the Related Art

An electrically heated catalytic converter (hereinafter referred to as "an EHC") disposed in an exhaust gas passage of an internal combustion engine is known in the art. The electrically heated catalytic converter is used for raising the temperature of the catalysts in the converter to their activating temperature in a short time after the engine has started.

When an internal combustion engine starts, since the amount of fuel supplied to the engine is increased to facilitate the engine starting, the amount of HC and CO in the exhaust gas increases. However, by supplying electricity to the EHC, the temperature of the converter reaches the activating temperature in a short time after the engine has started. Therefore, the converter starts its catalytic action for purifying HC and CO in the exhaust gas immediately after the engine has started, whereby the emission of HC and CO to the atmosphere after the start of the engine is reduced.

An electrically heated catalytic converter of this type is disclosed, for example, in Japanese Unexamined Patent Publication (Kokai) No. 4-279718.

The '718 publication discloses an EHC in which electricity is supplied from a battery to the EHC. The supply of electricity from the battery is continued for a period sufficient for raising the temperature of catalysts in the EHC to the activating temperature.

However, it is necessary to supply a relatively large electric power to the EHC for heating the catalysts in a short time. Therefore, if electricity is supplied from the battery, as in the system of the '718 publication, the load of the battery becomes large and damage to the battery may occur.

SAE paper No. 941042 (published in February, 1994) discloses another EHC system in which electricity is supplied to an EHC directly from a generator when the engine starts. Namely, the EHC system in the '042 paper is provided with a changeover switch which connects either of the battery and the EHC selectively to the generator. In a normal operation of the engine, the changeover switch connects the battery to the generator and charges the battery. However, the changeover switch disconnects the battery from generator and connects the EHC to the generator when the engine starts in order to supply electricity to the EHC directly from the generator.

In the EHC system of the '042 paper, since the battery is disconnected from the generator when electricity is supplied to the EHC, it becomes possible to supply a large electric power to the EHC by raising an output voltage of the generator to a value higher than a normal output voltage for charging the battery. Therefore, the EHC can be activated in a short time without imposing a large load on the battery. In the EHC system of the '042 paper, the EHC is disconnected from the generator, and the battery is connected to the generator after the temperature of the EHC reaches the activating temperature. Thus, the battery is charged by the generator in a normal operation after the EHC has activated.

However, since the exhaust gas temperature of an engine is low immediately after the engine starts, sometimes the EHC is cooled by the cold exhaust gas. Therefore, if the supply of electricity to the EHC is stopped after the EHC reaches the activating temperature, the temperature of the EHC again becomes lower than the activating temperature and the activity of the catalysts is lost. Thus, it is preferable to continue to supply electricity to the EHC even after the EHC has been activated in order to maintain the temperature of the EHC at a value higher than the activating temperature.

In the EHC system of the '042 paper, however, the battery is disconnected from the generator when electricity is supplied to the EHC. Therefore, since only the battery supplies electricity to all other electric loads of the engine when electricity is supplied to the EHC, an excessive discharge of the battery may occur if electricity is supplied to the EHC for a long period. Therefore, in the EHC system of the '042 paper, it is not possible to continue the supply of electricity to the EHC to maintain the catalytic activity of the EHC after it is activated.

On the other hand, since the battery in the EHC system of the '718 publication is always connected to the generator, it might be possible to continue to supply electricity to the EHC for maintaining the catalytic activity of the EHC even after the EHC reaches the activating temperature. However, since the battery in the '718 publication also supplies a large electric power for activating the EHC, the load of the battery becomes excessively large, and damage to the battery may occur if the battery continues to supply electricity to the EHC even after it is activated.

SUMMARY OF THE INVENTION

In view of the problems in the related art as set forth above, the object of the present invention is to provide a power supply control system for an electrically heated catalytic converter which is capable of raising the temperature of the converter to an activating temperature of the catalysts without increasing the load on a battery and, at the same time, is capable of supplying electric power sufficient for maintaining the catalytic activity of the EHC even after it has been activated.

This object is achieved by a power supply control system for an electrically heated catalytic converter according to one aspect of the present invention, which comprises an electric generator driven by an internal combustion engine, a battery, an electric heater for heating a catalytic converter disposed in an exhaust gas passage of the engine, a battery charging circuit which connects the battery with the generator and supplies an electric current for charging the battery, a catalyst heating circuit which directly connects the heater with the generator and supplies an electric current from the generator to the heater in order to raise the temperature of the catalytic converter to an activating temperature of catalysts in the catalytic converter, a temperature maintaining circuit which connects the heater with the battery and supplies an electric current from the battery to the heater in order to maintain the catalytic converter at the temperature higher than the activating temperature, first power supply control means for cutting off the battery charging circuit and the temperature maintaining circuit and closing the catalyst heating circuit when the engine has started, thereby heating the catalytic converter to the activating temperature, and second power supply control means for cutting off the catalyst heating circuit and closing the battery charging circuit and the temperature maintaining circuit when the temperature of the catalysts has reached the activating temperature, thereby charging the battery and, simultaneously, maintaining the catalytic converter at the temperature higher than the activating temperature.

According to this aspect of the invention, electric power required for heating the EHC to the activating temperature is directly supplied from the generator and, the battery supplies electric power to other electric loads in the condition where it is disconnected from the generator. This enables the operation of the generator with an output voltage higher than the output voltage for charging the battery. Therefore, a large electric power is supplied to the EHC without increasing the load on the battery and, thereby, the EHC is heated to the activating temperature in a short time after the engine has started.

Further, after the converter has been activated, the battery is connected to the generator and an electric power for maintaining the converter at the activated state is supplied from the battery. In this condition, though the electric power is supplied from the battery, the battery is also charged by the generator. Since the period in which the battery is disconnected from the generator, i.e., the time required for the converter to reach the activating temperature can be reduced to the minimum in this aspect of the invention, the consumption of the electric power stored in the battery when the converter has reached the activating temperature is small. Further, the electric power required for maintaining the converter at the activating temperature is small compared with the electric power required for heating the converter to the activating temperature. Therefore, the battery can be charged sufficiently even if it continues to supply the electric power for maintaining the converter at the activating temperature. Thus, according to this aspect of the invention, the electric power required for maintaining the converter at the activating temperature can be supplied from the battery without causing damage to the battery.

According to another aspect of the present invention, there is provided a power supply control system for an electrically heated catalytic converter which comprises an electric generator driven by an internal combustion engine, an electric heater for heating a catalytic converter disposed in an exhaust gas passage of the engine, a battery connected to the generator, a catalyst heating circuit which connects the heater with the battery and supplies an electric current from the battery to the heater in order to raise the temperature of the catalytic converter to an activating temperature of catalysts in the catalytic converter, a temperature maintaining circuit which connects the heater with a neutral point of the windings of the generator and supplies an electric current from the neutral point to the heater in order to maintain the catalytic converter at the temperature higher than the activating temperature, first power supply control means for cutting off the temperature maintaining circuit and closing the catalyst heating circuit when the engine has started, thereby, heating the catalytic converter to the activating temperature, and second power supply control means for cutting off the catalyst heating circuit and closing the temperature maintaining circuit when the temperature of the catalysts has reached the activating temperature, thereby maintaining the catalytic converter at the temperature higher than the activating temperature.

According to this aspect of the invention, the battery is permanently connected to the generator, and the electric power required for heating the EHC to the activating temperature is supplied from the battery. However, after the converter reaches the activating temperature, the EHC is connected to the neutral point of the generator windings and a small electric power corresponding to the voltage of the neutral point is supplied to the EHC. In this condition, a minimum electric power required for maintaining the converter at the activating temperature is supplied to the EHC from the neutral point of the generator, the load of the battery does not increases even if electric power is supplied to the EHC for a long time in order to maintain the converter at the activating temperature.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Hereinafter, an embodiment of the present invention will be explained in detail with reference to the accompanying drawings.

Figure 1:
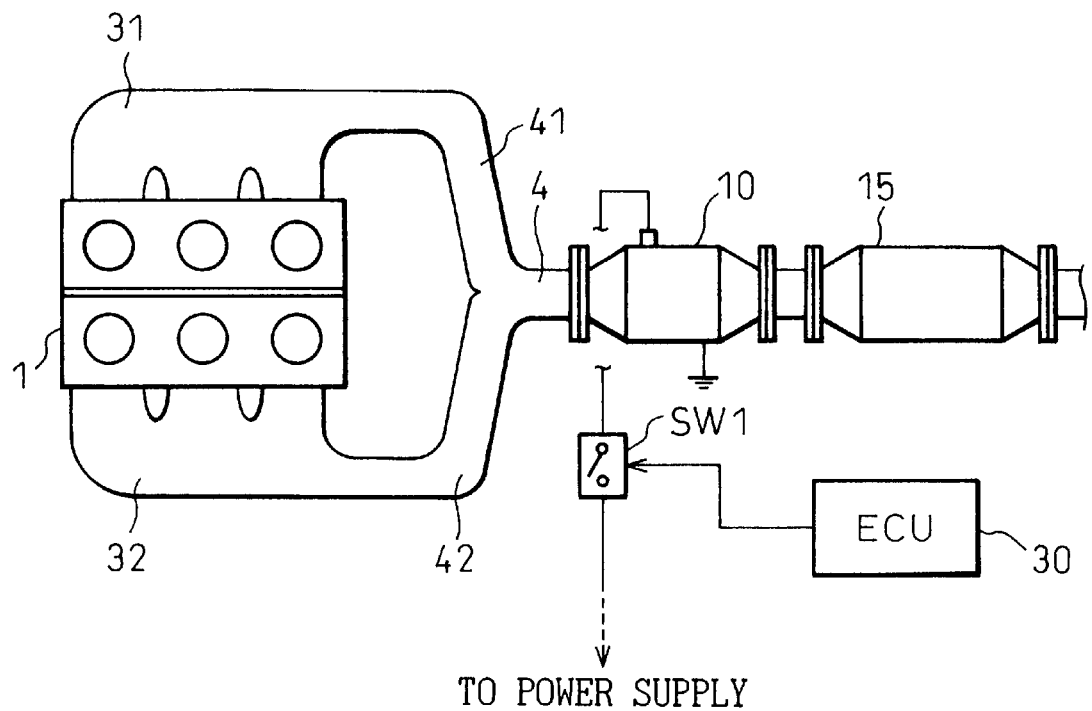
FIG. 1 schematically illustrates the general configuration of an embodiment of the present invention when it is applied to a vehicle engine.

FIG. 1 shows a general configuration of an embodiment of the present invention when it is applied to a power supply system of a vehicle.

In FIG. 1, reference numeral 1 designates an internal combustion engine of a vehicle (in this embodiment, a 6-cylinder V-type engine is used) numerals 31 and 32 designate exhaust manifolds of the respective cylinder banks of the engine 1. 41 and 42 are exhaust gas passages connected to the manifolds 31 and 32, respectively. The exhaust gas passages 41 and 42 merge to a common exhaust pipe 4. In this embodiment, a catalytic converter 10 equipped with an electric heater and a main catalytic converter 15 are disposed in the common exhaust gas pipe 4 in this order from the upstream side.

Figure 2:
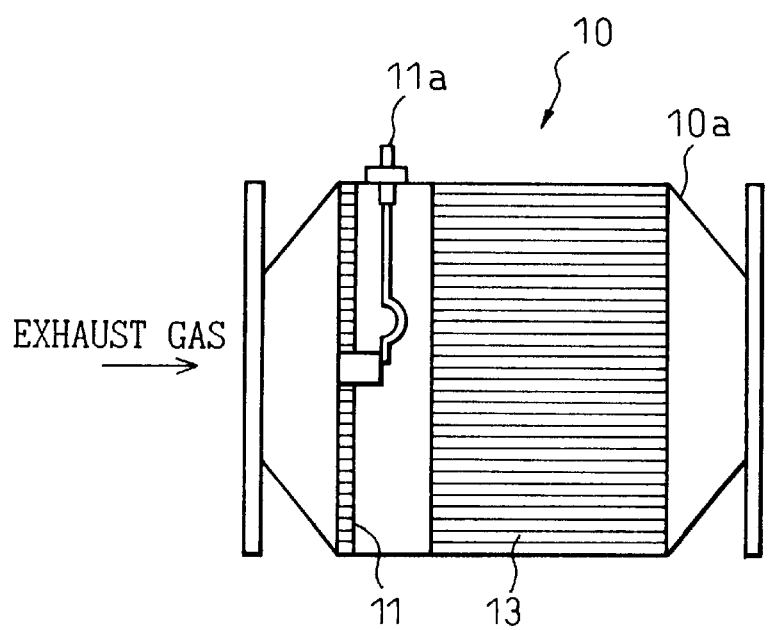
FIG. 2 is a cross sectional drawing illustrating the construction of an electrically heated catalytic converter.

FIG. 2 shows the cross section of the catalytic converter 10 in FIG. 1. The catalytic converter 10 includes a casing 10a which contains a small size electrically heated catalytic converter (EHC) 11 and a relatively large size catalytic converter (a light off catalyst) 13 disposed immediately downstream of the EHC 11. The EHC 11 is provided with a metal substrate to which catalytic components are attached. When the engine 1 starts, an electric voltage is imposed between an electrode 11a of the EHC 11 and the casing 10a, whereby an electric current flows through the substrate of the EHC 11. When the electric current flows through the substrate of the EHC 11, the temperature of the substrate, and the catalytic component attached thereto, is raised to an activating temperature of the catalytic components by the heat generated by the electric current. Since the volume of the EHC 11 is small, the EHC 11 is heated to the activating temperature in a short time after the electric current is supplied, and the catalytic components on the EHC 11 start an oxidizing reaction of HC and CO in the exhaust gas. When the oxidizing reaction starts at the EHC 11, the temperature of the EHC 11 becomes higher due to the heat generated by the reaction. The exhaust gas flowing through the EHC 11 is heated by the heat generated by the reaction, and the temperature of the exhaust gas also becomes high. This high temperature exhaust gas flows into the light off catalyst 13 disposed immediately downstream of the EHC 11 and, thereby, the temperature of the light off catalyst 13 also reaches the activating temperature. Thus, the oxidizing reaction of HC and CO also starts at the light off catalyst 13 shortly after the oxidizing reaction has started at the EHC 11. Since the volume of the light off catalyst 13 is large, a large amount of heat is generated by the oxidizing reaction in the light off catalyst 13. Therefore, the main catalyst 15 is heated by the exhaust gas flowing through the light off catalyst 13, and reaches the activating temperature in a relatively short time in spite of its large volume.

Numeral 30 in FIG. 1 designates an electronic control unit (ECU) of the engine 1. In this embodiment, the ECU 30 may be constructed by a microcomputer, and comprises a central processing unit (CPU), a read-only-memory (ROM), a random-access-memory (RAM) and an input/output interface, all mutually connected by a bi-directional bus. The ECU 30 performs basic control such as the fuel injection control and the ignition control of the engine and, in this embodiment, the ECU 30 also acts as various means in the claims such as the first and the second power supply control means for controlling the generator and power supply circuits.

Figure 3:
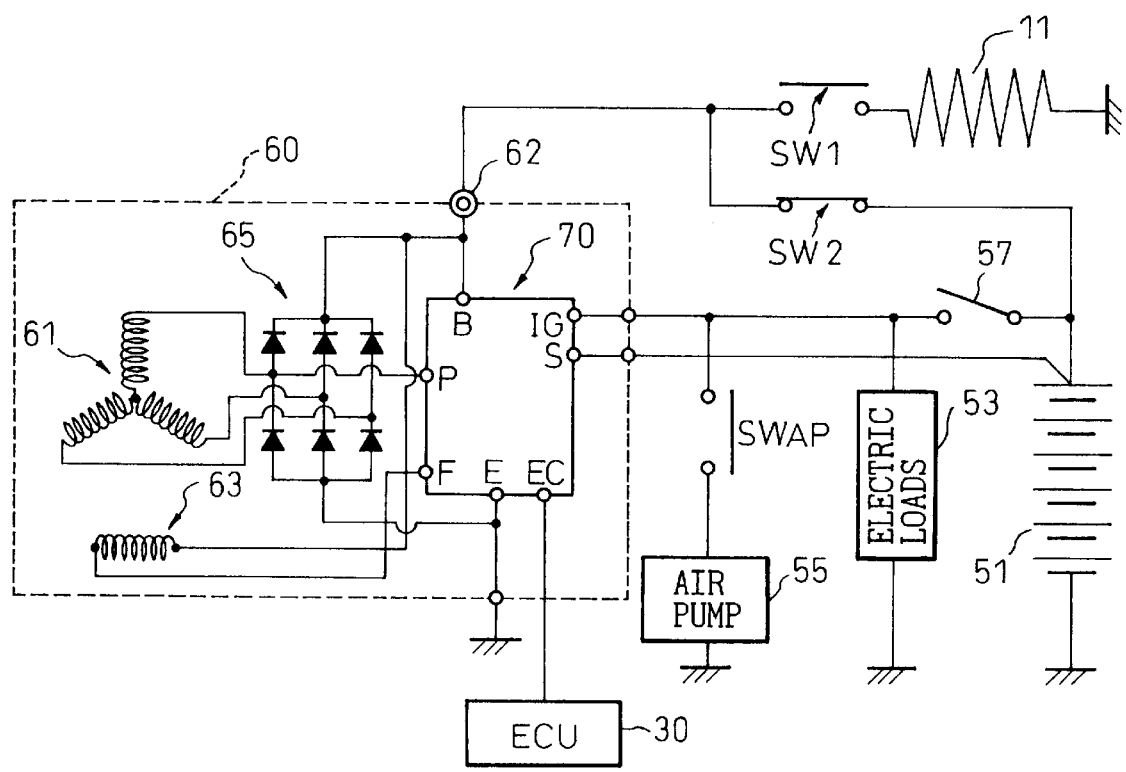
FIG. 3 is an embodiment of a circuit diagram of the power supply system used in the embodiment in FIG. 1.

FIG. 3 is an embodiment of the circuit diagram of the power supply circuit used in FIG. 1. In FIG. 3 numeral 60 designates a generator of the engine 1 as a whole. The generator 60 is a three-phase AC generator (alternator) which comprises stator windings 61, a rotor winding (a field winding) 63 which is driven by the output shaft of the engine 1, and a rectifier 65 which rectifies AC electric current generated in the stator windings 65 in accordance with the rotation of the rotor winding 63. The alternator 60 is also provided with a regulator 70 which controls an exciting current flowing through the rotor winding 63.

As shown in FIG. 3, the EHC 11 is connected to an output terminal 62 of the alternator 60 via a switch SW1. Further, a battery 51 of the engine 1 is connected to the output terminal 62 in a parallel arrangement with the EHC 11 via another switch SW2. Various electric loads of the vehicle are connected to the battery 51 via an ignition switch 57. In FIG. 3, numeral 55 represents an air pump for supplying secondary air to the common exhaust gas pipe 4 upstream of the converter 10. The air pump 55 is connected to the battery 51 via a switch SWAP. The air pump 55 is activated when the engine starts to supply oxygen to the converters 10 and 15.

In this embodiment, one end of the rotor winding 63 is connected to the output side of the rectifier 65 and another end thereof is connected to a terminal F of the regulator 70. Another terminal E of the regulator 70 is grounded. The terminals F and E are connected to each other within the regulator 70 via a switching transistor (not shown in the diagram). Therefore, the exciting current flows from the rectifier 65 to the terminal E through the rotor winding 63 can be controlled by turning on and off the switching transistor in the regulator 70. A voltage at the terminal of the battery 51 is supplied to another terminal S of the regulator 70.

Next, the function of the regulator 70 in this embodiment is explained. The regulator 70 controls the exciting current of the rotor winding 63 in accordance with the voltage BV of the battery 51 supplied to the terminal S during a normal operation of the engine (i.e., during the operation in which electric power is not supplied to the EHC 11). Namely, the regulator 70 cuts off the exciting current flowing through the rotor winding 63 by turning off the switching transistor when the battery voltage BV becomes higher than a predetermined value (for example, 14 V). Further, the regulator 70 supplies the exciting current to the rotor winding 63 by turning on the switching transistor when the battery voltage BV becomes lower than the predetermined value (for example, 14 V). By this control of the exciting current, the voltage BV of the battery terminal (i.e., a charging voltage of the battery) is controlled at a level lower than the predetermined value and, thereby, an overcharge of the battery can be prevented. This voltage control by the regulator 70 is hereinafter referred to as "the constant voltage control of the alternator".

Further, as shown in FIG. 3, a terminal EC of the regulator 70 is connected to the ECU 30 to receive a changeover signal (EC signal). As explained later, the regulator 70 stops the constant voltage control of the alternator and holds the switching transistor at an ON state regardless of the battery voltage BV when the EC signal is received from the ECU 30. In this condition, the exciting current flowing through the rotor winding 63 is kept at its maximum value and, thereby, the output voltage of the alternator 60 (the voltage at the terminal 62) rises. Although the output voltage of the alternator 60 under the maximum exciting current varies in accordance with the amount of the electric load connected to the alternator, the output voltage in this embodiment under the maximum exciting current increases to roughly twice (about 25 V) that in a normal operation (about 14 V).

Further, as explained later, a catalyst heating circuit is formed by turning on the switch SW1 and turning off the switch 2 when the EC signal is on in this embodiment. Also, in this embodiment, a temperature maintaining circuit is formed by turning on both of SW1 and SW2 when the EC signal is OFF, and a battery charging circuit is formed by turning on SW2 and turning off SW1 when the EC signal is OFF.

The regulator 70 is provided with a terminal P for detecting abnormal electric power, a terminal IG for detecting ON/OFF state of the ignition switch and a terminal B for power supply to the regulator 70, as shown in FIG. 3. However, since these terminals are not directly related to the present invention, a detailed explanation is not given here.

Next, the power supply control at engine starting, in this embodiment, is explained with reference to FIG. 4.

Figure 4:
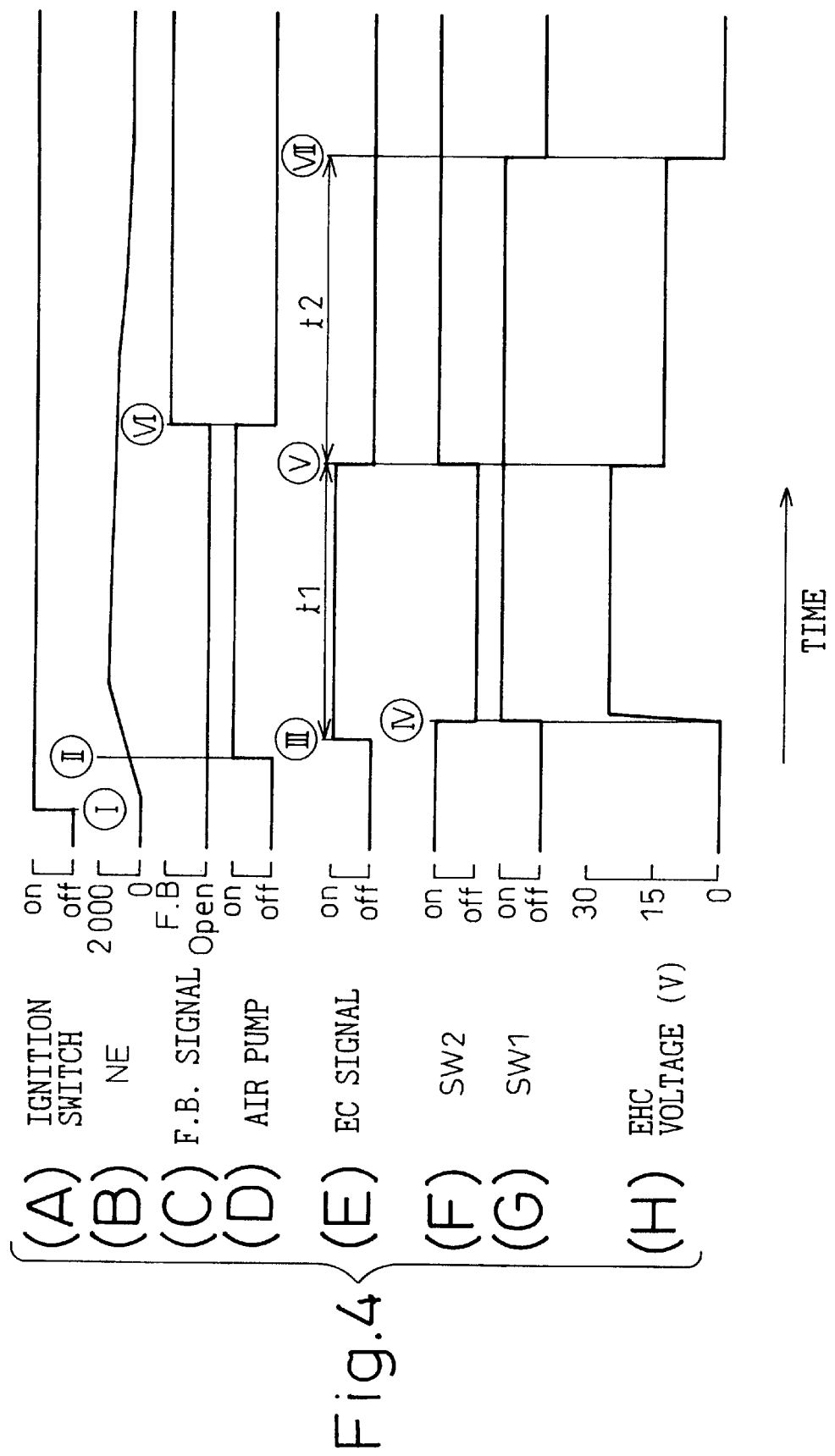
FIG. 4 is a timing diagram showing the power supply control in the circuit of FIG. 3.

FIG. 4 is a timing diagram showing the power supply control at the starting of the engine in this embodiment. In FIG. 4, the curve (A) illustrates the ON/OFF state of the ignition switch 57, the curve (B) illustrates the change in the speed NE of the engine 1, the curve (C) indicates the state of an air-fuel ratio feedback control signal which is explained later. Further, the curve (D) in FIG. 4 indicates the ON/OFF state of the air pump switch SWAP, the curve (E) indicates the state of the EC signal supplied from the ECU 30 to the EC terminal of the regulator 70, and the curves (F) and (G) indicate the ON/OFF state of the switches SW1 and SW2, respectively. The curve (H) in FIG. 4 illustrates the change in the voltage imposed on the EHC 11.

In FIG. 4, when the ignition switch 57 is turned on (the point I in the curve (A)), i.e., when the cranking of the engine by a starter motor (not shown) starts, the engine speed NE (the curve (B)) increases. When the engine speed NE reaches a predetermined value (for example, 600 rpm), the ECU 30 turns on the switch SWAP of the air pump 55 to supply secondary air to the exhaust gas pipe 4 upstream of the converters 10 and 15 (the point II in the curve (D). When the engine speed NE further increases to another predetermined value (for example, 800 rpm), the ECU 30 turns on the EC signal supplied to the terminal EC of the regulator 70 (the point III in the curve (E)) and, at the same time, turning on the switch SW1 and turning off the switch SW2 (the points IV in the curves (F) and (G)). Thus, only the EHC 11 is connected to the alternator 60 and the battery 51 is disconnected from the alternator 60. In this condition, electric power to the air pump 55 and the electric loads 53 of the vehicle is supplied only from the battery 51.

When the EC signal is received at the EC terminal, the switching transistor in the regulator 70 is held in the ON state. Therefore, the exciting current flowing through the rotor winding 63 increases to its maximum value and, thereby, an output voltage of the alternator largely higher than that in the normal operation (about 25 V) is imposed on the EHC 11 (the point IV in the curve (H)). Thus, a large amount of electric power (for example, about 2 kW) is supplied to the EHC 11 and, thereby, the EHC 11 is heated in a short time.

When the predetermined time t1 has lapsed in this condition and, thereby, the temperature of the EHC 11 reaches the activating temperature, the ECU 30 turns off the EC signal and turns on the SW2 to connect the battery 51 to the alternator 60, while keeping the SW1 in the ON state (the points V in the curves (E), (F) and (G)). In this condition, the EHC 11 and the battery 51 are connected in parallel with the alternator 60. Further, since the EC signal is turned off, the regulator 70 starts the constant voltage control of the alternator in which the output voltage is controlled in accordance with the battery voltage BV and, thereby, the output voltage of the alternator decreases to the battery charging voltage in the normal operation (the point V in the curve (H)). In this condition, since the voltage imposed on the EHC 11 decreases to about a half of the output voltage during a catalyst heating period (the period t1 in FIG. 4), the electric power consumption of the EHC 11 decreases to about a quarter (for example, 0.5 kW) of the consumption during the heating period t1. Therefore, though the battery 51 supplies electric power required for maintaining the temperature of the EHC 11, the battery 51 is sufficiently charged by the electric power supplied from the alternator 60.

In this embodiment, an air-fuel ratio sensor (not shown) is disposed in the common exhaust gas pipe 4 upstream of the converter 10 in order to detect the air-fuel ratio of the exhaust gas. The ECU 30 controls the amount of fuel supplied to the engine 1 based on the output signal of the air-fuel ratio sensor in such a manner that the air-fuel ratio of the engine is maintained at a stoichiometric air-fuel ratio. The air-fuel ratio sensor is capable of detecting the air-fuel ratio of the exhaust gas only when the temperature of the sensor is higher than a predetermined activating temperature. When the engine has started, the temperature of the sensor is low, and it cannot detect the air-fuel ratio of the exhaust gas. When the temperature of the sensor reaches the activating temperature after the engine has started, the sensor starts to detect the air-fuel ratio of the exhaust gas, and the ECU 30 also starts to control the air-fuel ratio of the engine. The air-fuel ratio feedback control signal (the curve (C) in FIG. 4) is a signal which is generated from the ECU 30 when it starts the air-fuel ratio feedback control after the engine starts. When the air-fuel ratio feedback control starts (the point VI in the curve (C)), the air-fuel ratio of the exhaust gas is controlled at a stoichiometric air-fuel ratio, and the amount of oxygen in the exhaust gas becomes sufficient to oxidize HC, CO in the exhaust gas. Therefore, the air pump 55 is stopped when the air-fuel ratio feedback control starts (the point VI in the curve (D) in FIG. 4).

The switch SW1 is turned off while keeping the switch SW2 in the ON state to isolate the EHC 11 from the alternator when a predetermined time t2 has lapsed after the battery 51 was connected to the alternator 60.

As explained above, according to the present embodiment, the battery 51 is disconnected from the alternator 60 when the engine starts and the electric power required for heating the EHC 11 to the activating temperature is directly supplied from the alternator 60 to the EHC 11. Further, after the EHC 11 has reached the activating temperature, battery 51 is connected to the alternator 60, and the electric power required for maintaining the EHC 11 at the activating temperature is supplied from the battery 51. Therefore, the EHC 11 can be heated to its activating temperature in a short time after the engine has started without increasing the load on the battery. Further, according to the present embodiment, since the load on the battery during the catalyst heating period (the period t1 in FIG. 4) is relatively low, damage to of the battery does not occur even though the battery 51 supplies the electric power required for maintaining the temperature of the EHC 11 during the catalyst temperature maintaining period (the period t2 in FIG. 4) after the EHC 11 has reached the activating temperature.

Figure 5:
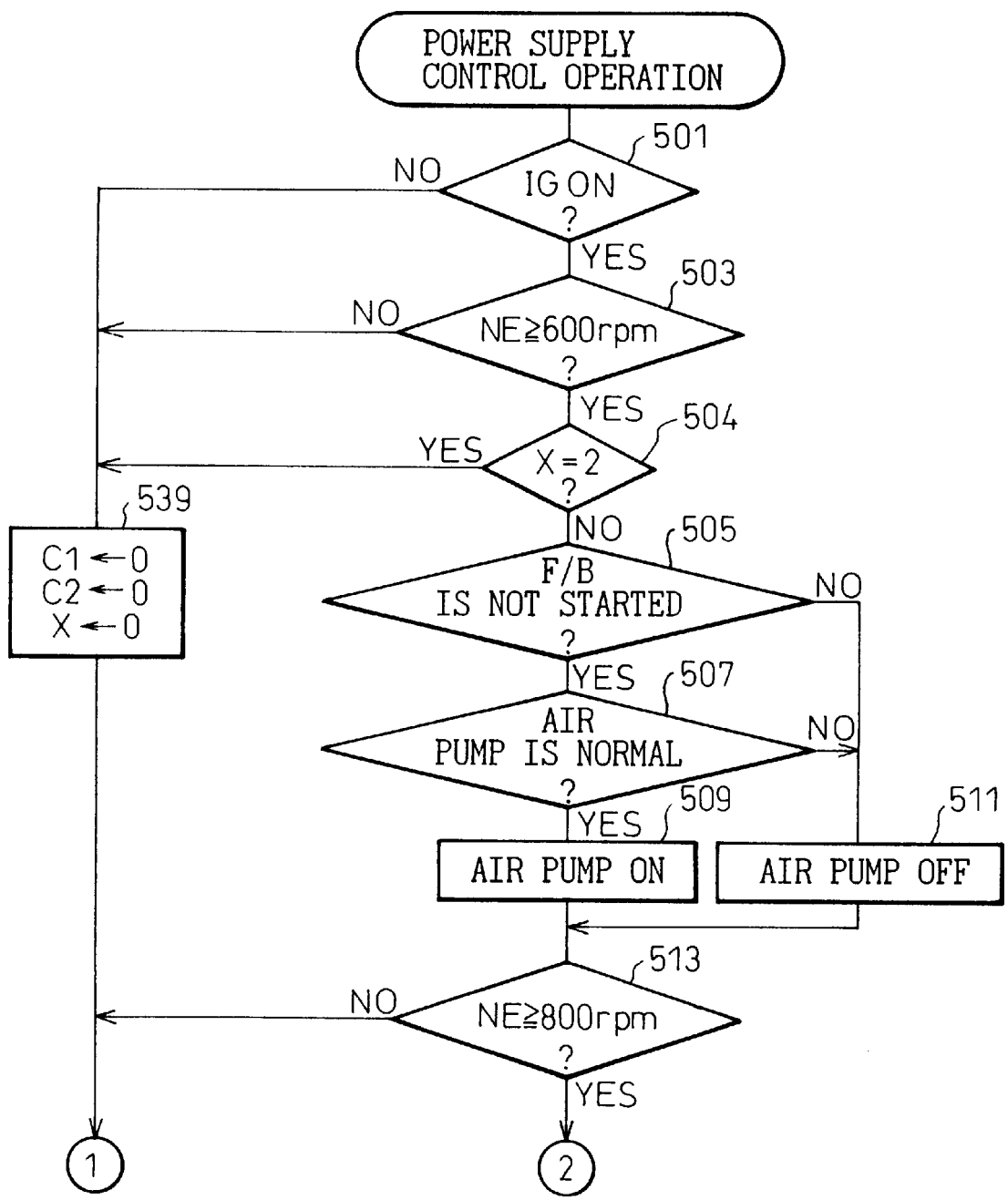
FIGS. 5 and 6 are a flowchart showing the power supply control operation explained in FIG. 4.
Figure 6:
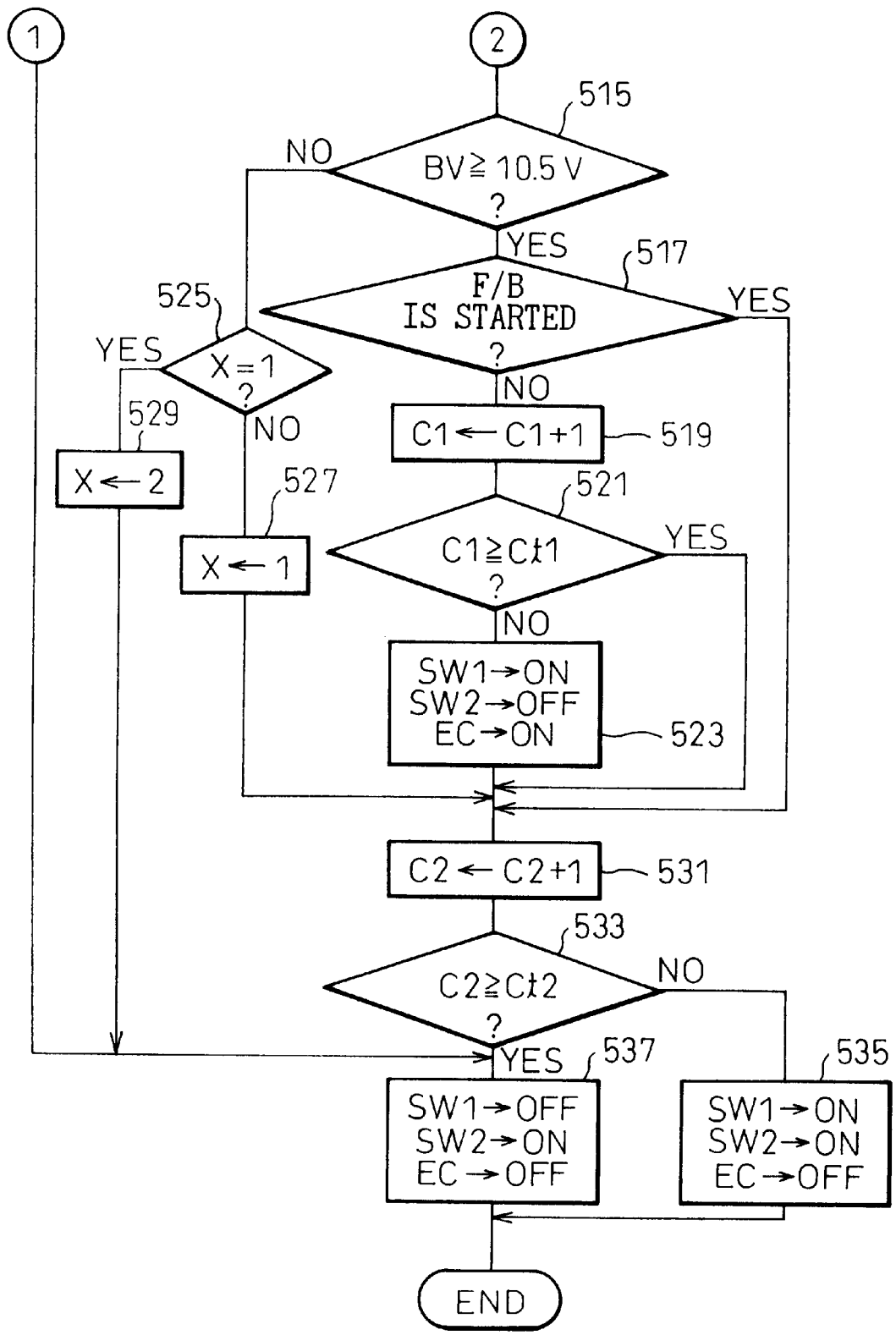

FIGS. 5 and 6 are a flowchart showing the power supply control operation of FIG. 4. This operation is performed by the ECU 30 by a routine executed by the ECU 30 at predetermined intervals.

In FIG. 5, at steps 501 and 503, it is determined whether the engine has started. Namely, the routine determines whether the ignition switch 57 is ON at step 501, and whether the engine speed NE has reached a predetermined value (for example, 600 rpm). If any of the conditions in steps 501 and 503 is not satisfied, the routine executes step 539 to clear the values of counters C1 and C2 and to set the value of a flag X to O. The counters C1, C2 and the flag X are explained later. Further, in this case, the routine then executes step 537 in FIG. 6. At step 537 in FIG. 6, the switch SW1 is turned off, the switch SW2 is turned on and the EC signal is turned off, i.e., the EHC 11 is isolated from the alternator 60 and the battery 51 is charged by the alternator 60. As explained later, when the battery voltage BV becomes low during the catalyst heating period, step 537 is also performed.

If both of the conditions of steps 501 and 503 are satisfied, the routine executes step 504 to determine whether the value of the flag X is set at 2. If X=2 at step 504, the routine performs steps 539 and 537 which were explained above. The value of the flag X is set in accordance with the battery voltage BV by steps 515 and 525 through 529. The value of the flag X is set to 2 when the battery voltage BV becomes lower than a predetermined value (for example, 10.5 V) even in the condition where the switch SW2 is turned on. In this condition, the supply of electric power to the EHC 11 is stopped by executing step 537 in order to protect the battery 51.

If X≠2 at step 504, the routine determines whether the conditions for operating the air pump are satisfied at steps 505 and 507. These conditions are whether the air-fuel ratio feedback control has not started (i.e., whether the air-fuel ratio feedback control signal (the curve (C) in FIG. 4) is OFF) (step 505) and whether the air pump is normal (step 507). If the air-fuel ratio feedback control has already started, it is not necessary to supply secondary air to the converters 10 and 15, and if the air pump is not normal (i.e., if the air pump has failed), the air pump cannot be operated. Therefore, if any of the conditions of steps 505 and 507 is not satisfied, the switch SWAP is turned off at step 511 to stop the operation of the air pump 55.

If both of the conditions of steps 505 and 507 are satisfied, the switch SWAP is turned on to supply secondary air to the converters 10 and 15.

In this condition, if it is determined that the engine speed NE has reached another predetermined value (for example, 800 rpm) which is higher than the predetermined value at step 503, control of the electric power supplied to the EHC 11 starts.

Steps 519, 521 and 523 are for controlling the electric power supplied to EHC 11 during the catalyst heating period. In steps 519, 521 and 523, SW1 is kept in the ON state while SW2 is kept in the OFF state and the EC signal (the curve (E) in FIG. 4) is held ON until the value of the counter C1 reaches a predetermined value Ct1. The counter C1 is increased by 1 every time step 519 is performed and represents the time elapsed from the start of the catalyst heating period. The predetermined value Ct1 at step 521 corresponds to the length of the catalyst heating period t1 in FIG. 4 and, in this embodiment, corresponds to about 30 seconds.

When the time t1 has lapsed from the start of the catalyst heating period, i.e., when C1 becomes larger than Ct1 at step 521, steps 531 through 537, in lieu of step 523, are performed to stop the supply of electric power for catalyst heating to the EHC 11 and to start the supply of electric power for maintaining the catalyst temperature. Namely, a counter C2 is increased by 1 at step 531, and SW1 and SW2 are held in the ON state and the EC signal is turned OFF at step 535 until the value of the counter C2 reaches a predetermined value Ct2. The value Ct2 corresponds to the catalyst temperature maintaining period (the period t2 in FIG. 4), and is set at, for example, about 150 seconds in this embodiment.

After the time t2 has lapsed at step 533, step 537 is executed to perform normal operation of the alternator 60 in order to charge the battery 51.

In FIG. 6, steps 515 and 525 through 529 are for protecting the battery 51. Namely, the routine determines whether the battery voltage BV is lower than a predetermined value (for example, 10.5 V). In this embodiment, when the battery voltage first becomes lower than 10.5 V, the value of the flag X is set at 1 by steps 525 and 527 and, then, steps 531 to 537 are performed. Therefore, even in the catalyst heating period, the supply of the electric power for heating the catalyst (steps 519 through 523) is stopped, and the electric power for maintaining the catalyst temperature is supplied to the EHC 11 to protect the battery 51 when the battery voltage becomes lower.

Further, if the battery voltage does not return to the value higher than the predetermined value (10.5 V) even though the catalyst temperature maintaining operation is performed, i.e., if the battery voltage BV is still lower than the predetermined value (10.5 V) at step 515, the value of the flag X is set to 2 at steps 525 and 527. In this case, step 537 is performed after step 504 from the next execution of the routine to charge the battery 51, and electric power is not supplied to the EHC 11 even when the engine has started.

Further, if the air-fuel ratio feedback control has started at step 517, since the air-fuel ratio of the exhaust gas is controlled at a stoichiometric air-fuel ratio and, thereby, the amount of HC and CO in the exhaust gas becomes small, the catalyst heating operation (step 523) is stopped immediately, and the routine proceeds directly to step 531 from step 517 to start the catalyst temperature maintaining operation.

Figure 7:
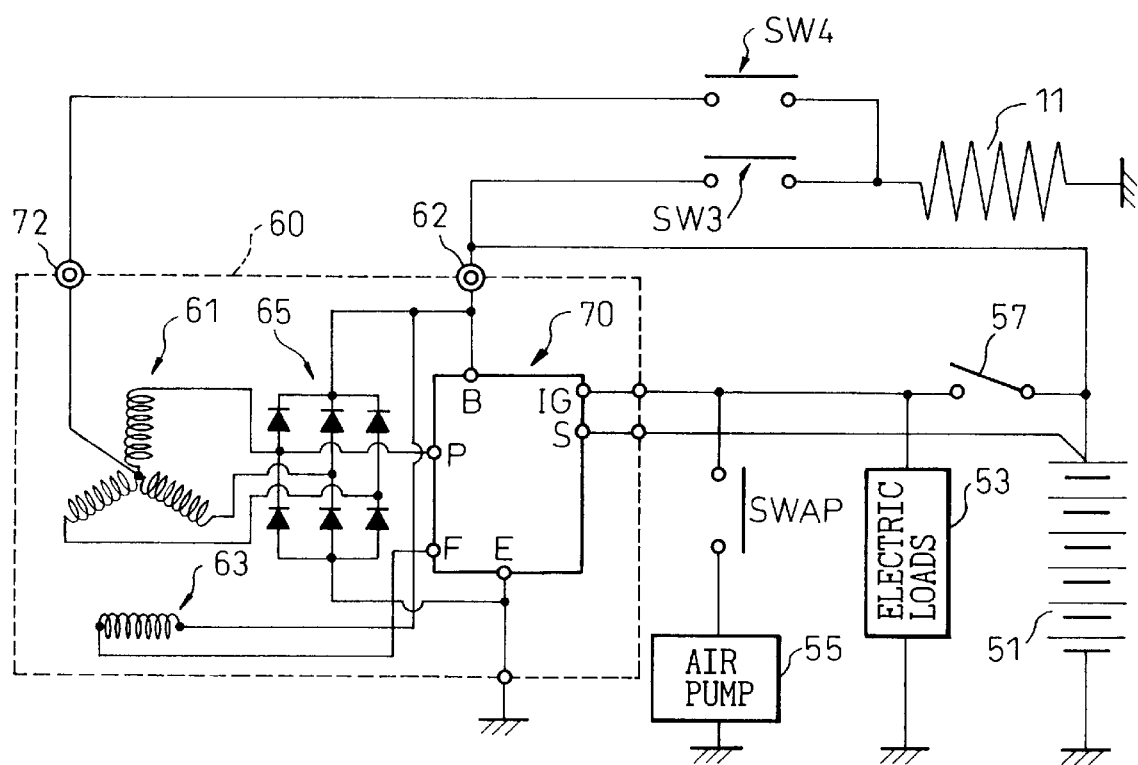
FIG. 7 is another embodiment of a circuit diagram of the power supply system used in the embodiment in FIG. 1.

Next, another embodiment of the present invention is explained with reference to FIG. 7. FIG. 7 is another embodiment of the circuit diagram of the power supply system used in FIG. 1. In FIG. 7, reference numerals the same as those in FIG. 3 represent similar elements.

In FIG. 7, alternator 60 is provided with another output terminal 72 in addition to the output terminal 62 of the rectifier 65. The output terminal 72 is directly connected to the neutral point of the stator windings 61 which are arranged in an Y-connection. Further, the switch SW2 in FIG. 3 is not provided in this embodiment, and the battery 51 is connected to the output terminal 62 permanently. The EHC 11 in this embodiment is connected to the neutral point output terminal 72 via a switch SW4. Further, the EHC 11 is also connected to the output terminal 62 via a switch SW3. In this embodiment, the regulator 70 is not provided with the EC terminal, i.e., the voltage of the output terminal 62 is always controlled in accordance with the battery voltage BV.

In this embodiment, when the engine has started, the ECU 30 turns on the switch SW3 and turns off the switch SW4 to supply electric power for heating the catalyst from the battery 51 to the EHC 11. After the time t1 has lapsed, i.e., when the EHC 11 reaches the activating temperature, the ECU 30 turns off the switch SW3 to isolate the EHC 11 from the battery 51 and turns on the switch SW4 to connect the EHC 11 to the neutral point output terminal 72 of the alternator 60. Namely, once the temperature of the EHC 11 reaches the activating temperature, the electric power for maintaining the EHC 11 at the activating temperature is supplied directly from the neutral point of the stator windings 61.

As seen from FIG. 7, the voltage of the neutral point output terminal 72 is a half of the voltage of the output terminal 62 (i.e., battery voltage). Therefore, when the EHC 11 is connected to the neutral point output terminal 72, the electric power supplied to the EHC 11 decreases to a value about a quarter of the electric power supplied to the EHC when it is connected to the battery 51. In this condition, since the voltage of the output terminal 62 is controlled at a predetermined value (for example, 14 V) by the regulator 70, battery 51 is charged by the generator in the same manner as in the normal operation.

Therefore, the load of the battery does not increase, and, thereby damage to the battery does not occur even if the electric power for maintaining the temperature of the EHC 11 is continuously supplied for a long time.

Figure 8:
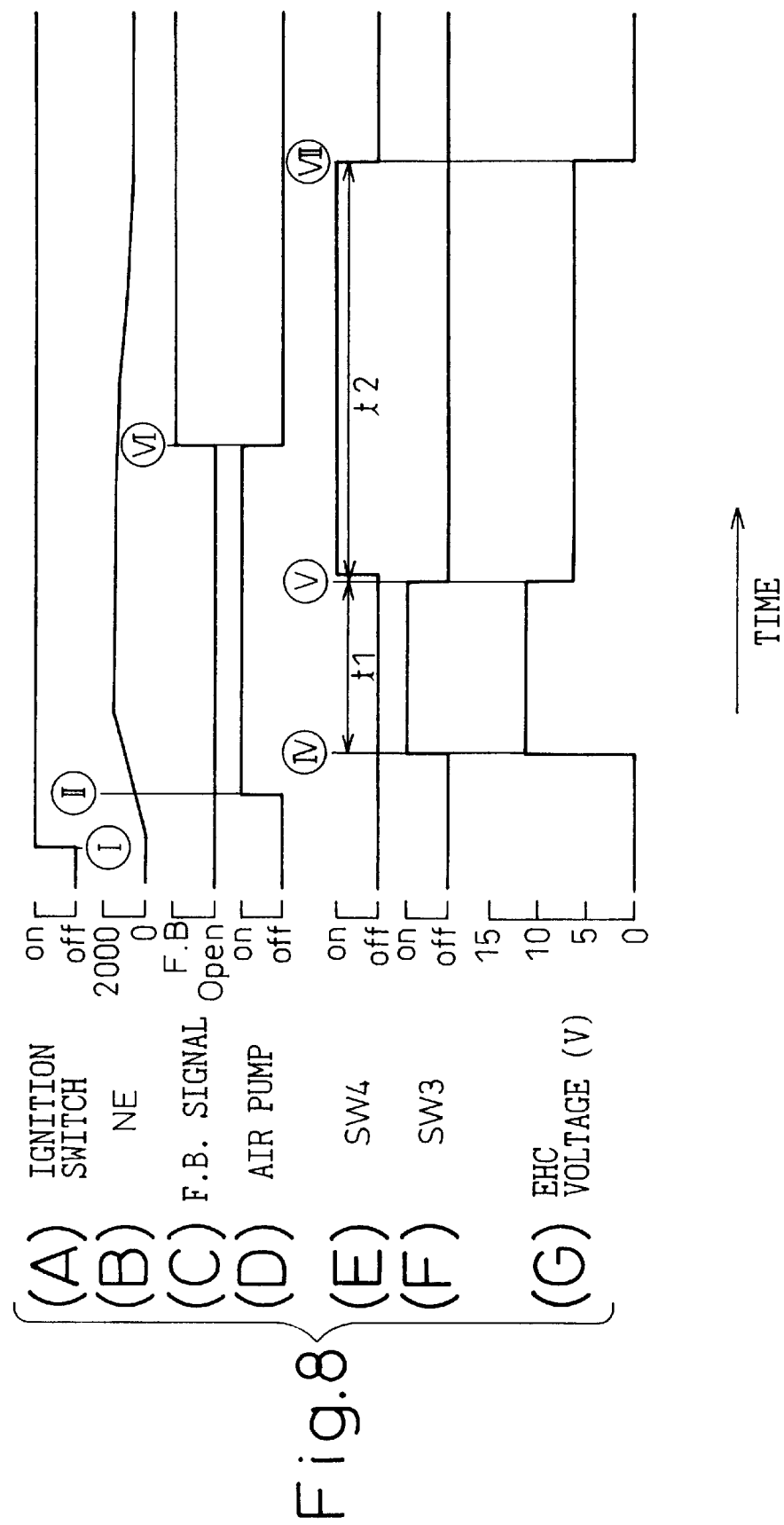
FIG. 8 is a timing diagram showing the power supply control in the circuit of FIG. 7.

FIG. 8 is a timing diagram similar to FIG. 4 which explains the power supply control according to the present embodiment. In FIG. 4, the curve (A) illustrates the ON/OFF state of the ignition switch 57, the curve (B) illustrates the change in the speed NE of the engine 1, the curve (C) indicates the state of the air-fuel ratio feedback control signal. The curve (D) indicates the ON/OFF state of the air pump switch SWAP, and the curves (E) and (F) indicate the ON/OFF states of the switches SW4 and SW3, respectively. The curve (G) in FIG. 8 illustrates the change in the voltage imposed on the EHC 11. The points I through VII in FIG. 8 correspond to the timing indicated by the points I through VII in FIG. 4. The diagram FIG. 8 is different from that in FIG. 4 in that the SW3 is turned on and the SW4 is turned off at the point IV, and that the SW3 is turned off and the SW4 is turned on at the point V and, further, that both the SW3 and SW4 are turned off at the point VI.

Figure 9:
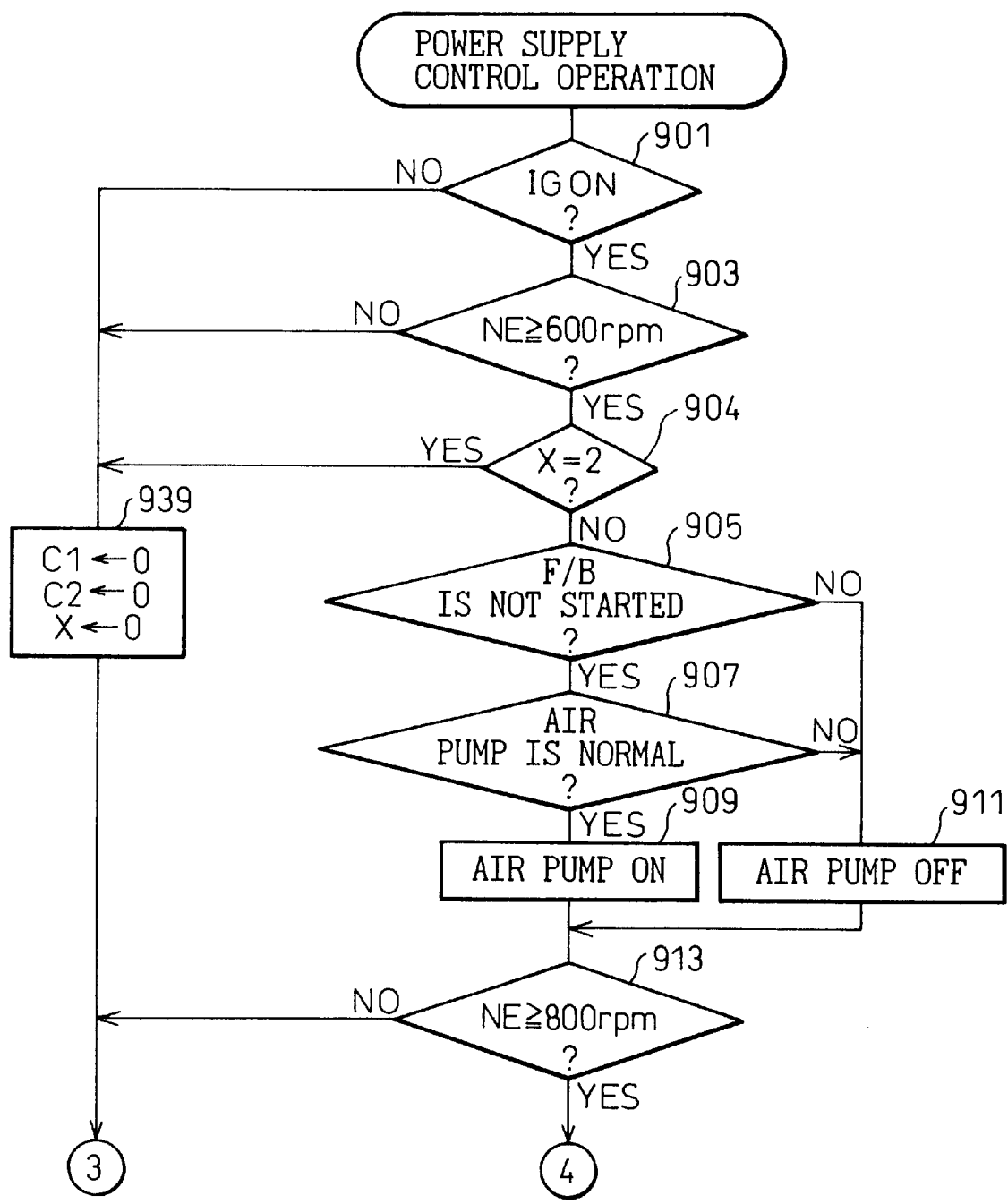
FIGS. 9 and 10 are a flowchart showing the power supply control operation explained in FIG. 8.
Figure 10:
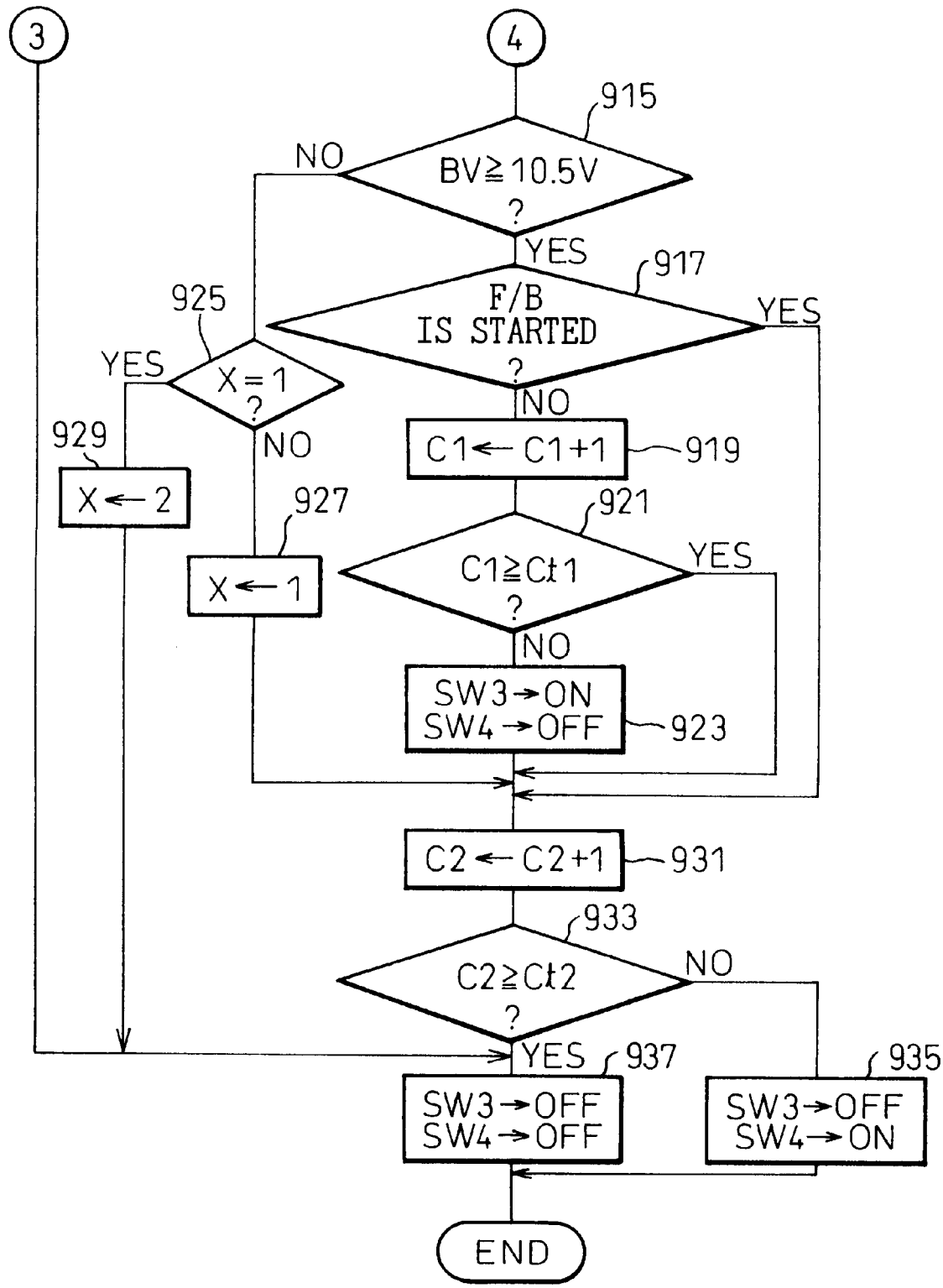

FIGS. 9 and 10 are a flowchart explaining the power supply control operation illustrated in FIG. 8. This operation is performed by a routine executed by the ECU 30 at predetermined intervals. The flowchart in FIGS. 9 and 10 is similar to the flowchart in FIGS. 5 and 6 and, since only the operations of the switches SW3 and SW4 as noted above (steps 923, 935 and 937) are different from the flowchart in FIGS. 5 and 6, a detailed explanation thereof is omitted.

Although electric power is supplied to the EHC 11 only after the engine has started in the embodiments explained above, electric power may be also supplied to the EHC 11 before the engine has started to, thereby, shorten the time required for EHC 11 to reach the activating temperature. In this case, for example, both the switches SW1 and SW2 (FIG. 3) or the switch SW3 (FIG. 7) is turned on in order to supply electric power to EHC 11 from the battery 51 when the ignition switch 57 is turned on and, these switches are all turned off to avoid excess loading on the battery when the starter motor switch is turned on.

Further, in the embodiments explained above, no electric power is supplied to the EHC 11 after the catalyst temperature maintaining period has elapsed. However, in the actual operation of the engine, the temperature of the converters 10 and 15 become lower in some cases (for example, when the idle operation of the engine continues for a long time under a low ambient temperature). In such a case, electric power for maintaining the temperature of the EHC 11 may be supplied to the EHC 11 by the control explained in the respective embodiment at predetermined intervals. In this case, for example, the electric power for maintaining the temperature of the EHC 11 may be supplied at intervals when the idle operation of the engine (the operation of the engine with a throttle valve fully closed) continues for more than a period determined in accordance with the ambient temperature.

As explained above, the power supply control system according to the present invention is capable of raising the temperature of the EHC to the activating temperature in a short time and, at the same time, is capable of supplying the electric power required to maintain the temperature of the EHC after the EHC reaches the activating temperature without increasing the load on the battery.

We claim:

1. A power supply control system for an electrically heated catalytic converter comprising:

an electric generator driven by an internal combustion engine;

a battery;

an electric heater for heating a catalytic converter disposed in an exhaust gas passage of the engine;

a battery charging circuit which connects the battery with the generator and supplies an electric current for charging the battery;

a catalyst heating circuit which directly connects the heater with the generator and supplies an electric current from the generator to the heater in order to raise the temperature of the catalytic converter to an activating temperature of catalysts in the catalytic converter;

a temperature maintaining circuit which connects the heater with the battery and supplies an electric current from the battery to the heater in order to maintain the catalytic converter at the temperature higher than the activating temperature;

first power supply control means for cutting off the battery charging circuit and the temperature maintaining circuit and closing the catalyst heating circuit when the engine has started, thereby heating the catalytic converter to the activating temperature; and second power supply control means for cutting off the catalyst heating circuit and closing the battery charging circuit and the temperature maintaining circuit when the temperature of the catalysts has reached the activating temperature, thereby charging the battery and, simultaneously, maintaining the catalytic converter at the temperature higher than the activating temperature.

2. A power supply control system for an electrically heated catalytic converter comprising:

an electric generator driven by an internal combustion engine;

an electric heater for heating a catalytic converter disposed in an exhaust gas passage of the engine;

a battery connected to the generator;

a catalyst heating circuit which connects the heater with the battery and supplies an electric current from the battery to the heater in order to raise the temperature of the catalytic converter to an activating temperature of catalysts in the catalytic converter;

a temperature maintaining circuit which connects the heater with a neutral point of the windings of the generator and supplies an electric current from the neutral point to the heater in order to maintain the catalytic converter at the temperature higher than the activating temperature;

first power supply control means for cutting off the temperature maintaining circuit and closing the catalyst heating circuit when the engine has started, thereby, heating the catalytic converter to the activating temperature; and second power supply control means for cutting off the catalyst heating circuit and closing the temperature maintaining circuit when the temperature of the catalysts has reached the activating temperature, thereby maintaining the catalytic converter at the temperature higher than the activating temperature.

* * * * *